(12) United States Patent
Blohm

(10) Patent No.: US 11,562,265 B2
(45) Date of Patent: Jan. 24, 2023

(54) INTELLIGENT DATA ANALYTICS

(71) Applicant: Nicole Blohm, Mount Pleasant, SC (US)

(72) Inventor: Nicole Blohm, Mount Pleasant, SC (US)

(73) Assignee: RICOH COMPANY, LTD., Tokyo (JP)

( * ) Notice: Subject to any disclaimer, the term of this patent is extended or adjusted under 35 U.S.C. 154(b) by 436 days.

(21) Appl. No.: 16/804,373

(22) Filed: Feb. 28, 2020

(65) Prior Publication Data
US 2021/0271985 A1    Sep. 2, 2021

(51) Int. Cl.
*G06F 15/16*    (2006.01)
*G06N 5/04*    (2006.01)
*G06N 20/00*    (2019.01)

(52) U.S. Cl.
CPC .............. *G06N 5/04* (2013.01); *G06N 20/00* (2019.01)

(58) Field of Classification Search
CPC ................................ G06N 5/04; G06N 20/00
USPC ........................................................ 709/200
See application file for complete search history.

(56) References Cited

U.S. PATENT DOCUMENTS

| | | | | |
|---|---|---|---|---|
| 6,434,544 B1* | 8/2002 | Bakalash | .......... | G06F 16/24556 |
| | | | | 707/999.102 |
| 2002/0029207 A1* | 3/2002 | Bakalash | .............. | G06F 16/283 |
| 2002/0129003 A1* | 9/2002 | Bakalash | .......... | G06F 16/24539 |
| 2002/0129032 A1* | 9/2002 | Bakalash | .......... | G06F 16/24556 |
| 2002/0143783 A1* | 10/2002 | Bakalash | .............. | G06F 16/30 |
| 2002/0184187 A1* | 12/2002 | Bakalash | ............ | G06F 16/2455 |
| 2014/0167917 A2 | 6/2014 | Wallace | | |
| 2016/0364772 A1* | 12/2016 | Denton | .............. | G06Q 30/0242 |
| 2017/0191849 A1* | 7/2017 | Agam | .................... | G08G 1/148 |
| 2018/0005274 A1* | 1/2018 | Calvillo | ................ | G06F 16/958 |
| 2018/0025306 A1* | 1/2018 | Batca | ............... | G06Q 10/06315 |
| | | | | 705/7.25 |
| 2020/0176124 A1 | 6/2020 | Chatterjea | | |
| 2020/0364585 A1* | 11/2020 | Chandrashekar | ........ | G06N 5/04 |
| 2021/0233163 A1* | 7/2021 | Tosmur | .................. | G06Q 40/02 |
| 2022/0293281 A1 | 9/2022 | Nuggehalli et al. | | |

OTHER PUBLICATIONS

European Patent Office, "Search Report" in Application No. 22160470.5-1126, dated Jul. 13, 2022, 9 pages.

* cited by examiner

*Primary Examiner* — Moustafa M Meky
(74) *Attorney, Agent, or Firm* — Hickman Becker Bingham Ledesma LLP; Edward A. Becker

(57) ABSTRACT

An approach is provided for accessing and managing data from multiple heterogeneous data sources, processing the data to generate processing results, and providing user access to the processing results via a portal. The portal provides unified intelligent views of the processing results across the heterogeneous data sources, providing a single source of facts and trends. Embodiments include controlling user access to the views based upon user credentials.

17 Claims, 19 Drawing Sheets

100

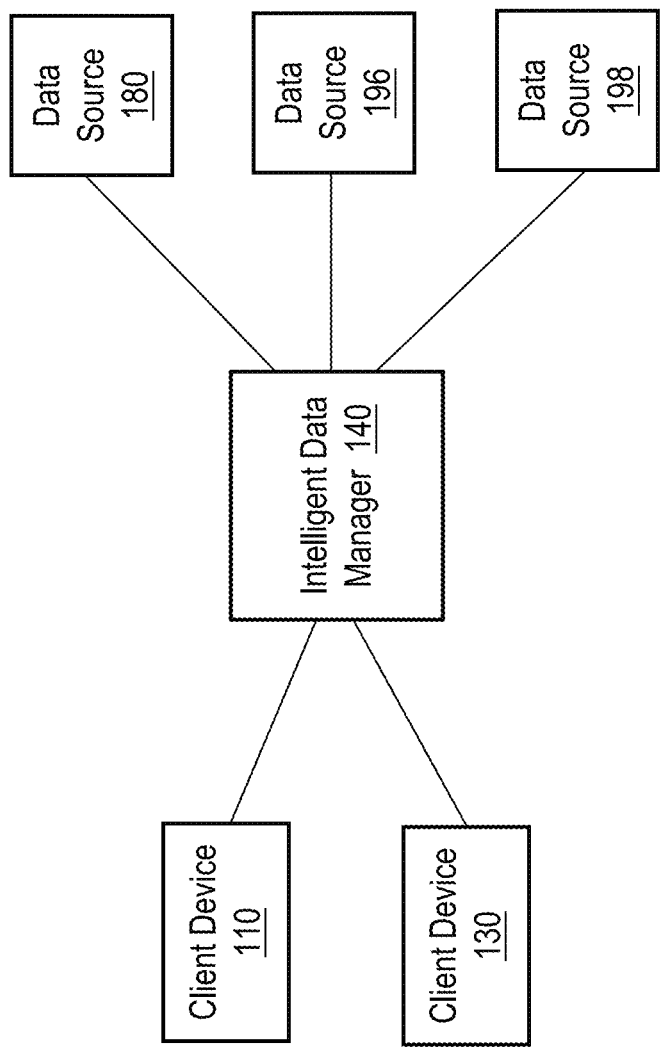

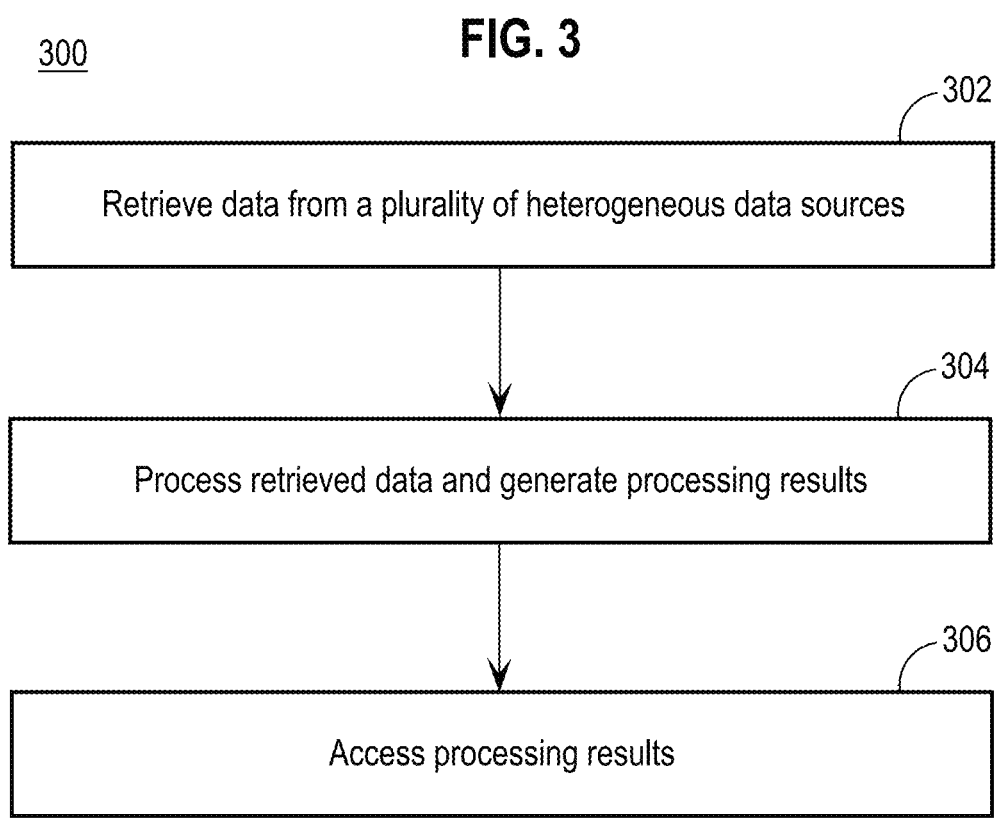

INTELLIGENT DATA ANALYTICS

FIELD

The technical field of the present disclosure relates to computing processes for acquiring and managing data from heterogeneous data sources.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Business organizations often have several, and in some cases, numerous business systems with different types of data. For example, a business organization may have one type of business system that manages sales data and a separate and different business system that manages operations data. These business systems are often heterogeneous systems that execute their own business processes that are not capable of communicating with or sharing their data with each other. For example, it is not uncommon for the business applications to manage their own data and even if they have Application Program Interfaces (APIs), they are unique. Consequently, it is not possible for personnel of the business organization to process data across multiple business systems, for example, to analyze data across multiple business systems to provide forecasting.

SUMMARY

A computing device comprises one or more processors, one or more memories, and an intelligent data management application executing on the computing device. The intelligent data management application is configured to retrieve source data from a plurality of heterogeneous data sources via one or more computer networks, wherein each data source, from the plurality of data sources, supports a different Application Program Interface (API). The intelligent data management application is also configured to process the source data from the plurality of heterogeneous data sources to generate processing results and provide at least a subset of the processing results to a client device via one or more computer networks.

The aforementioned approaches may also be implemented by one or more computer-implemented processes and non-transitory computer-readable media that store instructions which, when processed by one or more processed, implement the approach.

BRIEF DESCRIPTION OF THE DRAWINGS

Embodiments are depicted by way of example, and not by way of limitation, in the figures of the accompanying drawings and in which like reference numerals refer to similar elements.

FIG. 1A is a block diagram that depicts an intelligent data management arrangement that includes mobile devices, an intelligent data manager, and data sources.

FIG. 2I is a block diagram that depicts example types of analytics data.

FIG. 3 is a flow diagram that depicts an approach for generating intelligent data analytics from a plurality of heterogeneous data sources.

DETAILED DESCRIPTION

Figure 1C:
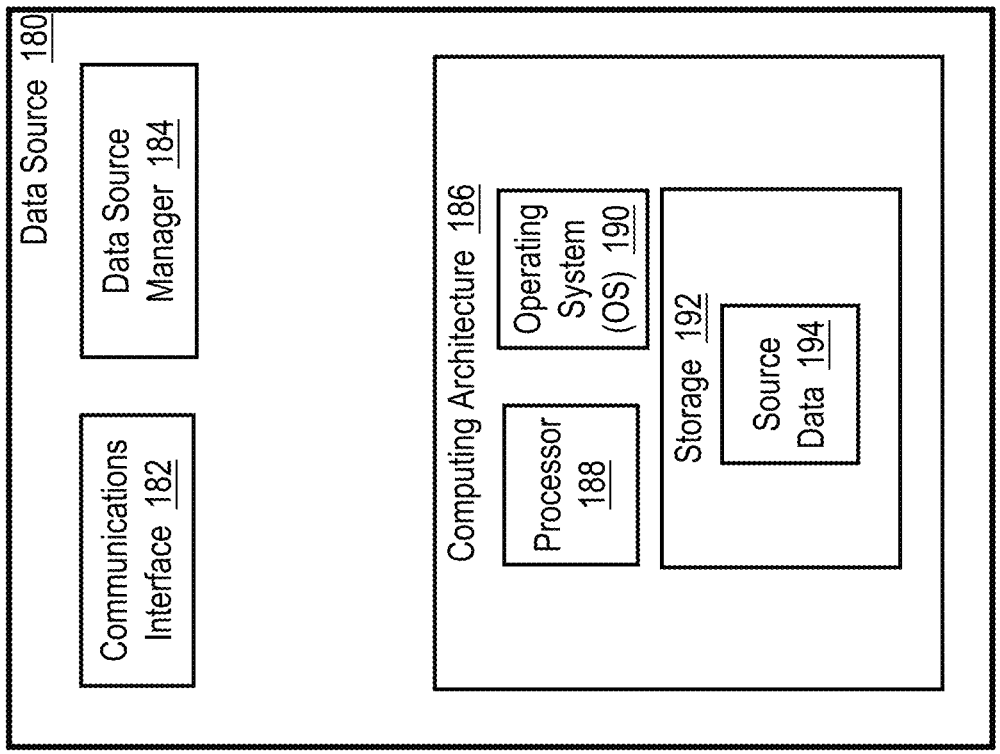
FIG. 1C is a block diagram that depicts an example implementation of data source that is also applicable to data sources.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. Intelligent Data Management Architecture
  A. Client Devices
  B. Data Sources
  C. Intelligent Data Manager
III. Intelligent Data Analytics
IV. Implementation Examples

I. Overview

An approach is provided for accessing and managing data from multiple heterogeneous data sources, processing the data to generate processing results, and providing user access to the processing results via a portal. The portal provides unified intelligent views of the processing results across the heterogeneous data sources, providing a single source of facts and trends. Embodiments include controlling user access to the views based upon user credentials.

This approach provides a technical solution to the technical problem of how to access and manage data stored in heterogeneous data sources that each implements a unique API. The technical solution includes an intelligent data management application that supports the APIs of the heterogeneous data sources. The intelligent data management application retrieves source data from the heterogeneous data sources using their respective APIs, either directly or using Robotic Process Automation (RPA). The intelligent data management application may convert or transform the source data to conform to one or more specified data types and processes the source data into processing results. The intelligent data management application provides access to the processing results via client devices using views without the client devices having to support the APIs of the heterogeneous data sources.

II. Intelligent Data Management Architecture

FIG. 1A is a block diagram that depicts an intelligent data management arrangement 100 that includes client devices 110, 130, an intelligent data manager 140, and data sources 180, 196, 198. The elements of FIG. 1A may be communicatively coupled via one or more wireless and/or wired computer networks of any type, and/or direct communications links that are not depicted in FIG. 1A for purposes of explanation. Intelligent data management arrangement 100 may include additional or fewer elements, depending upon a particular implementation.

A. Client Devices

Client devices 110, 130 may be implemented by any type of computing device that allows a user to access the intelligent data manager 140. Examples of client devices 110, 130 include, without limitation, a desktop computer, a laptop computer, a tablet computer, a personal digital assistant, a smart phone, etc. Although embodiments are described herein in the context of two client devices 110, embodiments are applicable to the intelligent data management arrangement 100 having any number of mobile devices.

Figure 1B:
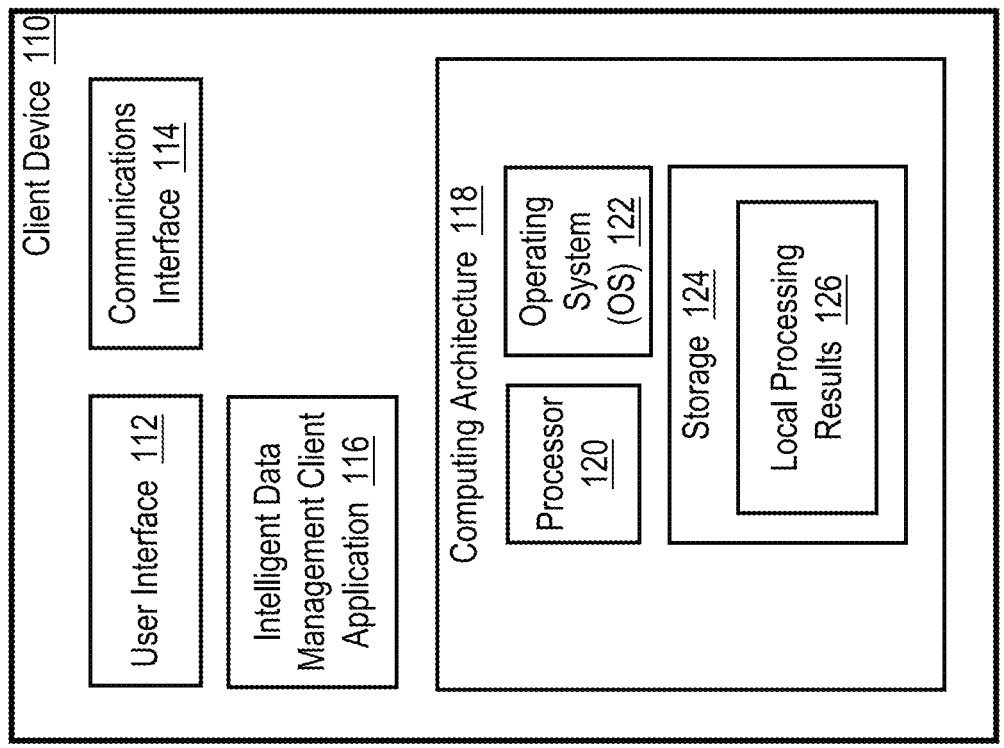
FIG. 1B is a block diagram that depicts an example implementation of client device that is also applicable to client device.

FIG. 1B is a block diagram that depicts an example implementation of client device 110 that is also applicable to client device 130. In this example, the client device 110 includes a user interface 112 for displaying information to a user and receiving user input. The client device 110 also includes a communications interface 114 that provides wireless and/or wired communications with other computing devices via one or more computing networks.

An intelligent data management client application 116 provides access to the intelligent data manager 140 and may be implemented, for example, by a stand-alone application or a Web client, such as a Web browser. A computing architecture 118 includes a processor 120, an operating system (OS) 122 that support the execution of processes on client device 110, and storage 124, such as volatile and/or non-volatile memory. Storage 124 may store local copies of data from the intelligent data manager 140, such as local processing results 126, as described in more detail hereinafter. Client device 110 may include other components and elements that vary depending upon a particular implementation and embodiments are not limited to client device 110 having particular components and elements.

B. Data Sources

Data sources 180, 196, 198 are sources of data for the intelligent data manager 140 and the data stored therein may be in different formats and structured differently, depending upon a particular implementation. For example, within a business organization, the data source 180 contains and manages sales data, operations data, and design and/or management data. The data sources 180, 196, 198 have different processes for managing their respective data and support different APIs for accessing functionality and data stored thereon.

FIG. 1C is a block diagram that depicts an example implementation of the data source 180 that is also applicable to the data sources 196, 198. In this example, the data source 180 includes a communications interface 182 that provides wireless and/or wired communications with other computing devices via one or more computing networks.

A data source manager 184 supports an API that provides access to functionality of the data source 180 and data stored on the data source 180. A computing architecture 186 includes a processor 188 and an operating system (OS) 190 that support the execution of processes on the data source 180. A storage 192, which may include volatile and/or non-volatile memory, includes source data 194. The data source 180 may include other components and elements that vary depending upon a particular implementation and embodiments are not limited to the data source 180 having particular components and elements.

C. Intelligent Data Manager

The intelligent data manager 140 acquires data from the data sources 180, 196, 198, processes the data to generate processing results, and makes the processing results available to the client devices 110, 130. Processing of the data may include various business functionality, such as analysis, trending, Service Level Agreement (SLA) benchmarking, estimating, predicting, forecasting, etc. Users of the client devices 110, 130 may view the processing results in a single location, even though the client devices 110, 130 do not support the APIs of the data sources 180, 196, 198.

Figure 1D:
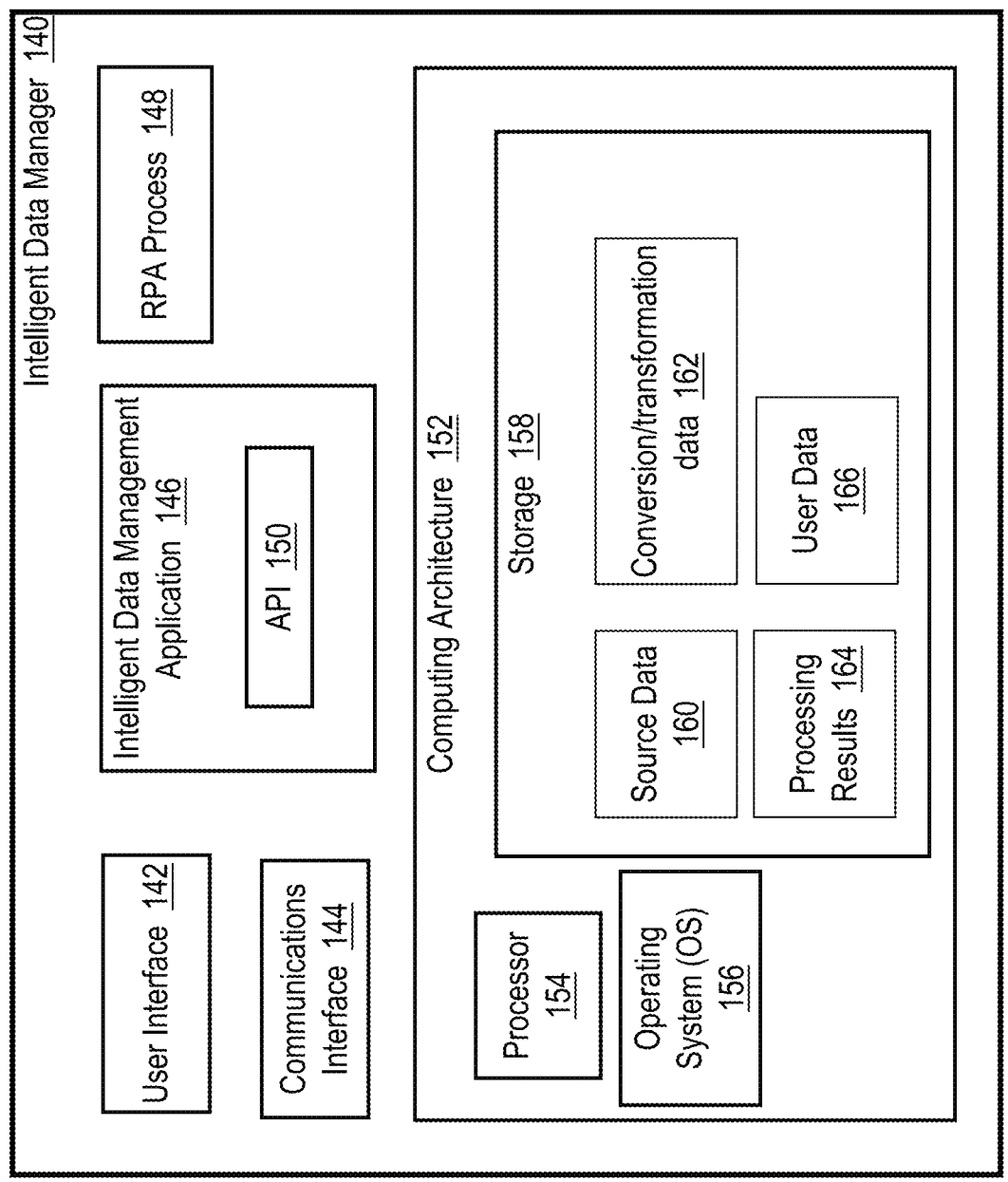
FIG. 1D is a block diagram that depicts an example implementation of the intelligent data manager.

FIG. 1D is a block diagram that depicts an example implementation of the intelligent data manager 140. In this example, the intelligent data manager 140 includes a user interface 142 for displaying information to users and receiving user input. A communications interface 144 provides wireless and/or wired communications with other computing devices via one or more computing networks.

An intelligent data management application 146 acquires data from the data sources 180, 196, 198, processes the data to generate processing results, and makes the processing results available to the client devices 110, 130. The intelligent data management application 146 may acquire data from the data sources 180, 196, 198 in a variety of ways. For example, the intelligent data management application 146 may be configured to support APIs of the data sources 180, 196, 198 to access to the functionality and data of the data sources 180, 196, 198. The intelligent data management application 146 then issues commands that conform to the APIs of the data sources 180, 196, 198 to retrieve data from the data sources 180, 196, 198. According to an embodiment, the intelligent data management application 146 is capable of modification to communicate with, and retrieve data from, other data sources that become available at a later point in time. This capability may be added, for example, by an administrative user, or accomplished using RPA as described hereinafter. According to an embodiment, the intelligent data management application 146 includes an API that exposes and provides access to the functionality and data of the intelligent data management application 146.

As another example, RPA may be used to retrieve data from the data sources 180, 196, 198. In the example implementation of the intelligent data manager 140 depicted in FIG. 1D, an RPA process 148 provides RPA services for acquiring data from the data sources 180, 196, 198. The RPA process 148 may capture user actions via the user interface 142 of the intelligent data manager 140 and create one or more action lists that include the user actions. The RPA process 148 then executes the one or more action lists to acquire data from the data sources 180, 196, 198.

The intelligent data management application 146 may be implemented by one or more processes executing on the intelligent data manager 140. For example, the intelligent data management application 146 may be implemented as a stand-alone application or an application integrated into other processes and may use libraries, etc. One example implementation of the intelligent data management application 146 is a cloud service.

A computing architecture 152 includes a processor 154, an operating system (OS) 156 that supports the execution of processes on the intelligent data manager 140, and storage 158, which may include volatile and/or non-volatile memory. In the example depicted in FIG. 1D, the storage 158 includes source data 160, conversion/transformation data 162, processing results 164, and user data 166, each of which are described in more detail hereinafter. The intelligent data manager 140 may include other components and elements that vary depending upon a particular implementation and embodiments are not limited to the data source 180 having particular components and elements.

Figure 1E:
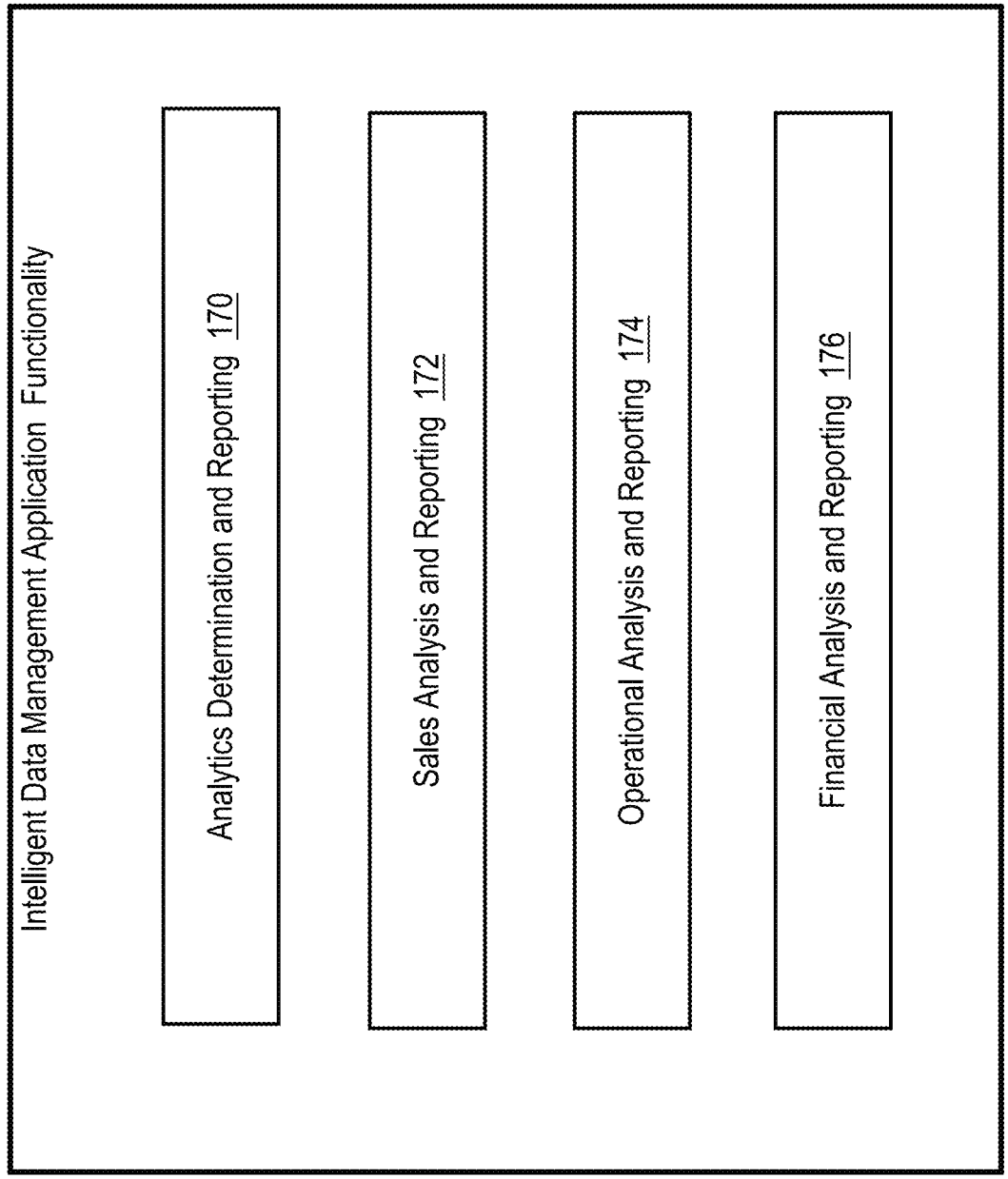
FIG. 1E is a block diagram that depicts example functionality implemented by an intelligent data management application.

The intelligent data management application 146 may implement many different types of functionality to process the source data that may vary depending upon a particular implementation. FIG. 1E is a block diagram that depicts example functionality implemented by the intelligent data management application 146. In this example, the functionality includes analyst analysis and reporting 170, sales analysis and reporting 172, operational analysis and reporting 174, and financial analysis and reporting 176.

Figure 2A:
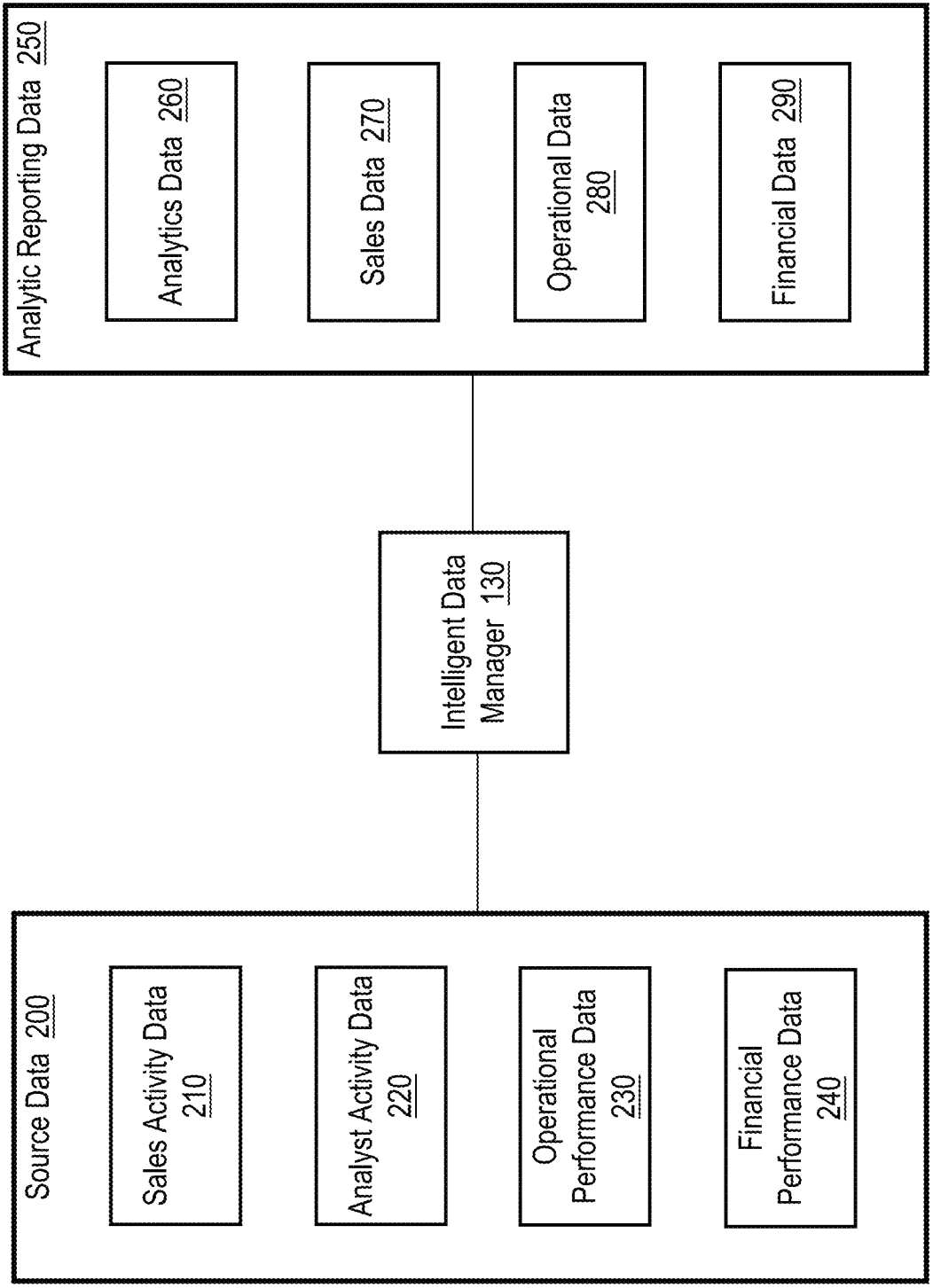
FIG. 2A is a block diagram that depicts logical relationships between source data, obtained from data sources, and analytic reporting data generated by the intelligent data manager after processing the source data.

FIG. 2A is a block diagram that depicts logical relationships between source data 200, obtained from the data sources 180, 196, 198, and analytic reporting data 250 generated by the intelligent data manager 140 after processing the source data 200. In this example, the source data 200 includes sales activity data 210, analyst activity data 220, operational performance data 230, and financial performance data 240. The analytic reporting data 250 includes analytics data 260, sales data 270, operational data 280, and financial reporting data 290.

Figure 2B:
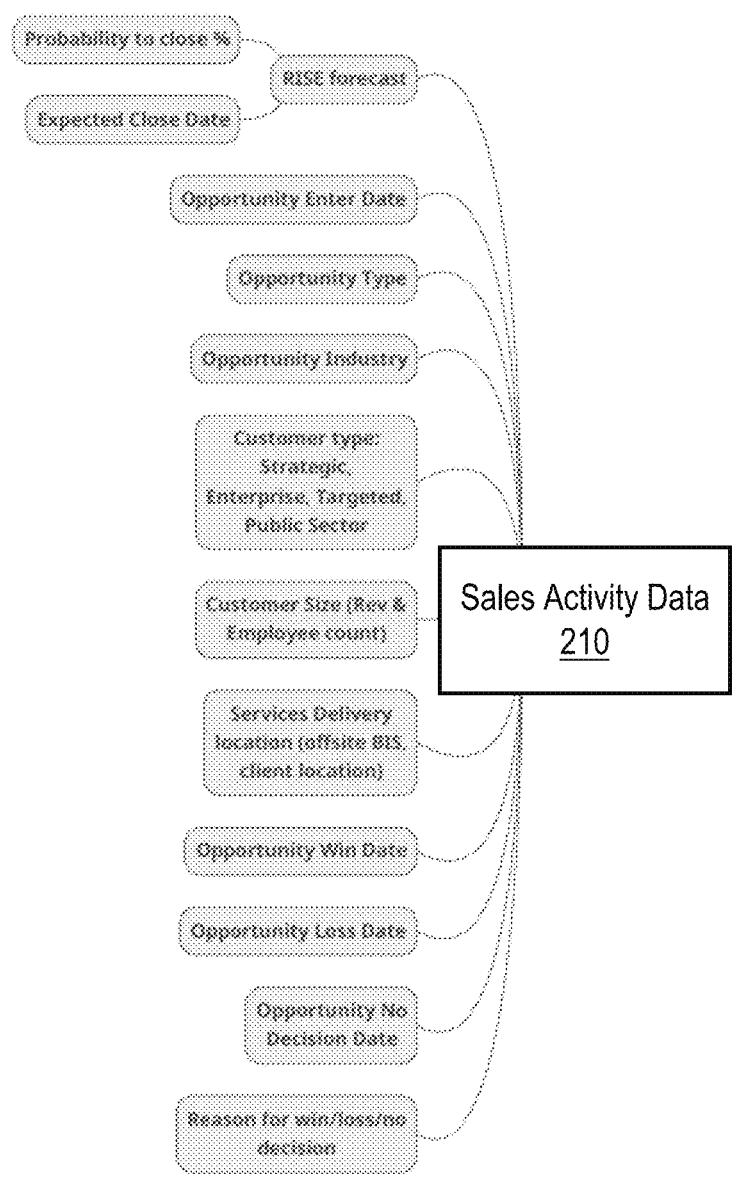
FIG. 2B is a block diagram that depicts example types of sales activity data.

FIG. 2B is a block diagram that depicts example types of the sales activity data 210. The example of FIG. 2B depicts RISE forecast data for purposes of explanation, but embodiments are not limited to the RISE Customer Relationship Management (CRM) tool and are applicable to forecast data from any CRM tool.

Figure 2C:
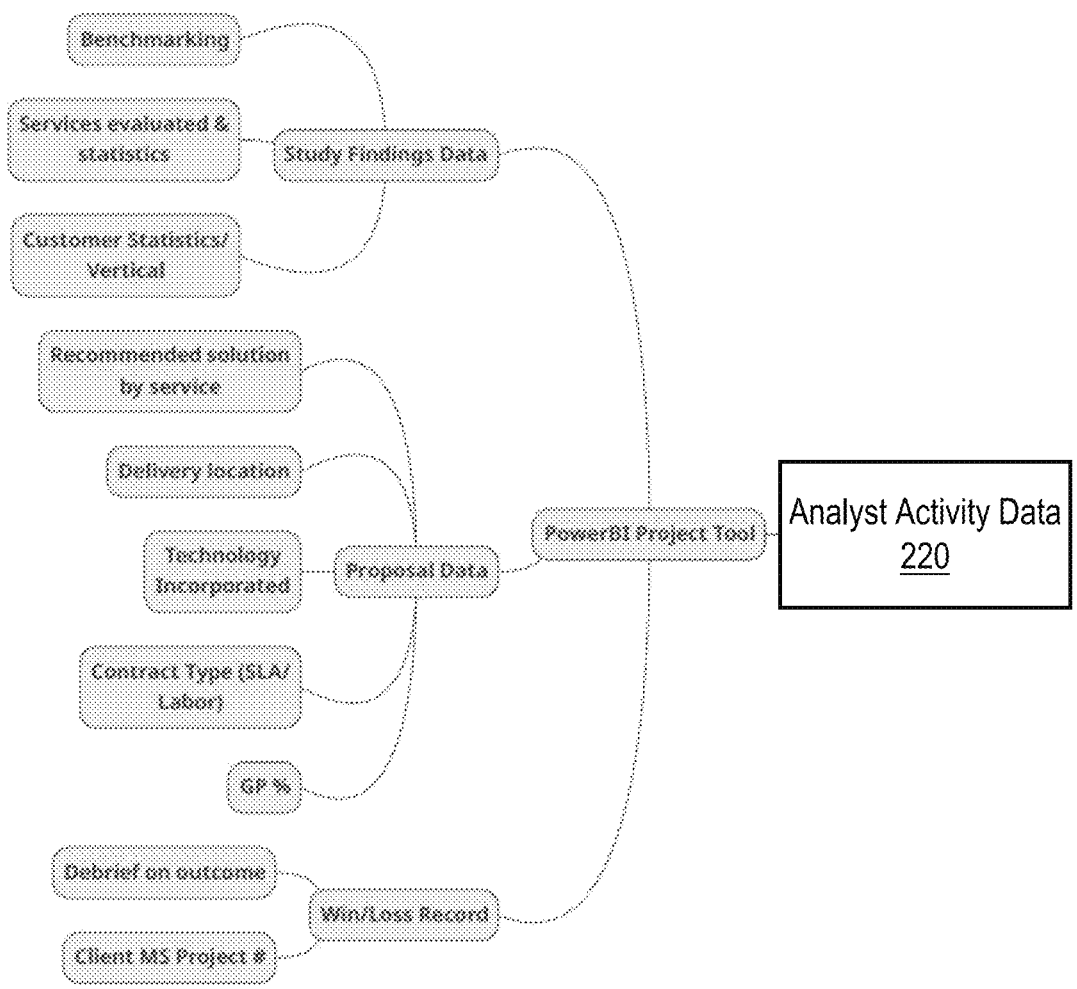
FIG. 2C is a block diagram that depicts example types of analyst activity data.

FIG. 2C is a block diagram that depicts example types of the analyst activity data 220. In this example, the first level of the analyst activity data 220 includes Power BI project tool data, which includes study findings data, proposal data, and win/loss record data. The example of FIG. 2C depicts Power BI project analytics tool data for purposes of explanation, but embodiments are not limited to the Power BI project analytics tool and are applicable to analyst activity data from any project management tool and the associated analytics.

Figure 2D:
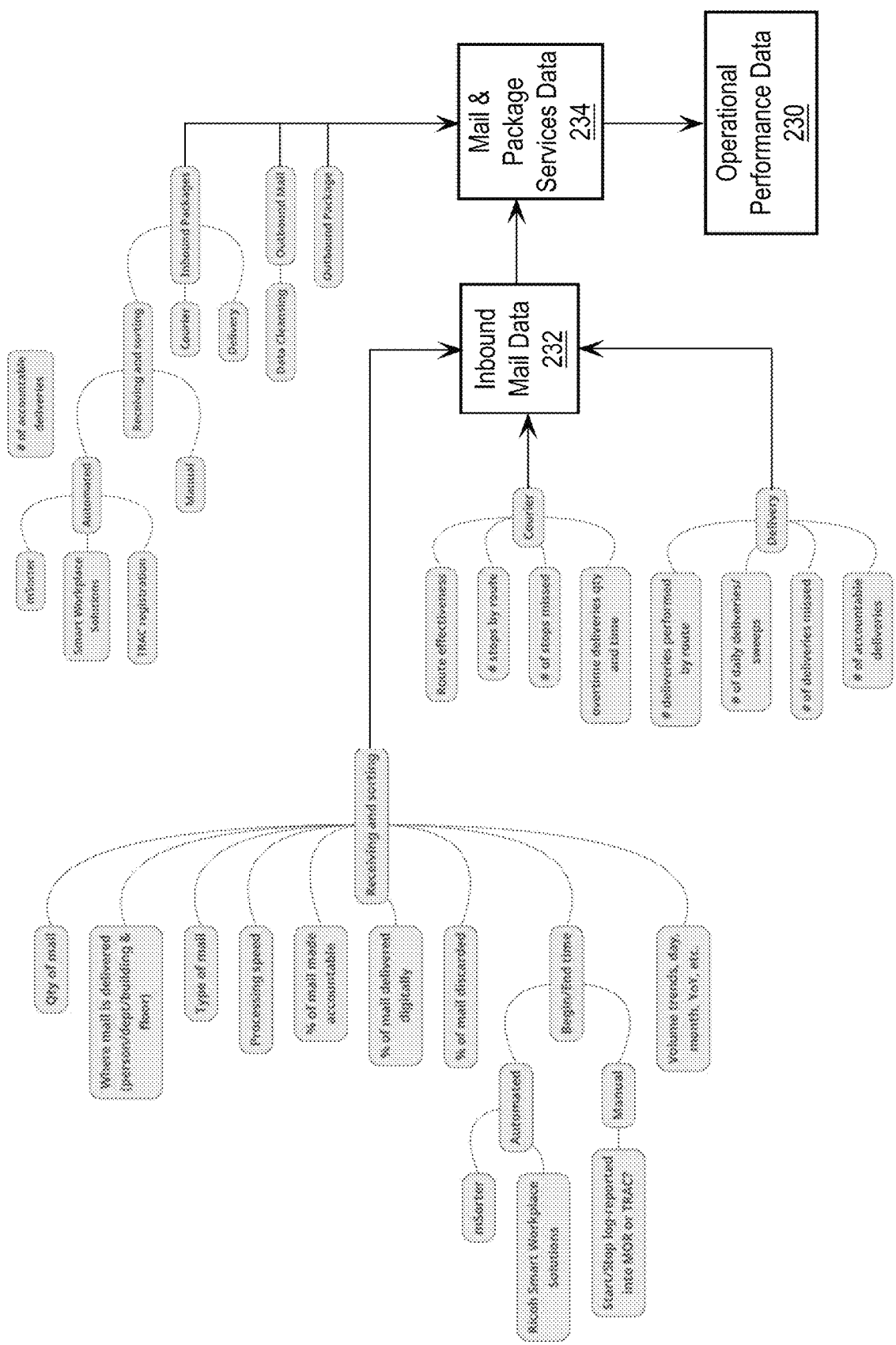
FIG. 2D is a block diagram that depicts example types of operational performance data 230, including inbound mail data and mail and package services data.

FIG. 2D is a block diagram that depicts example types of the operational performance data 230. In this example, the operational performance data 230 includes inbound mail data 232 and mail and package services data 234.

Figure 2E:
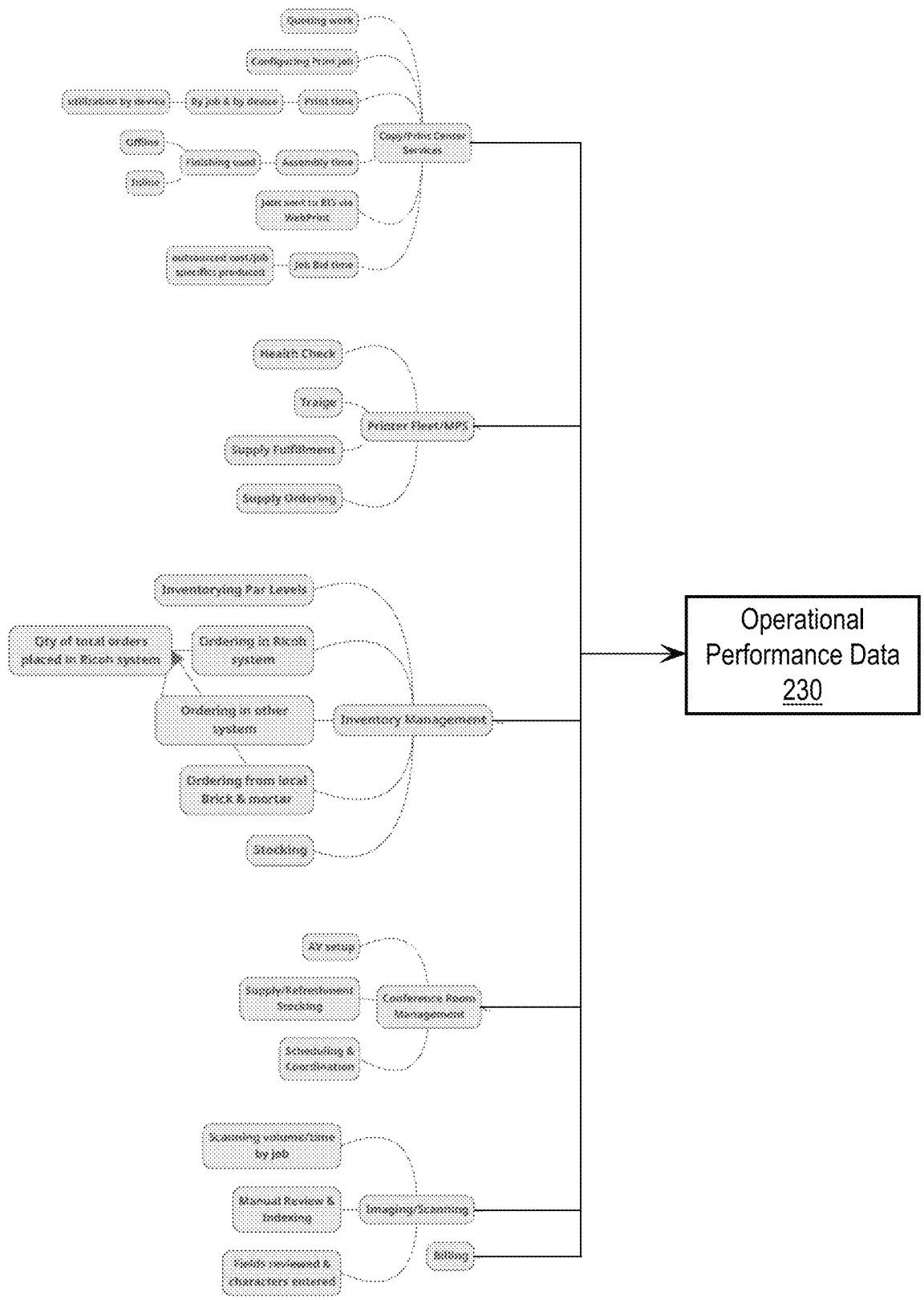
FIG. 2E is a block diagram that depicts other example types of operational performance data.

FIG. 2E is a block diagram that depicts other example types of the operational performance data 230. In this example, the first level of the operational performance data 230 includes copy/print center services data, printer fleet/Managed Print Services, inventory management data, conference room management data, imaging/scanning data, and billing data.

Figure 2F:
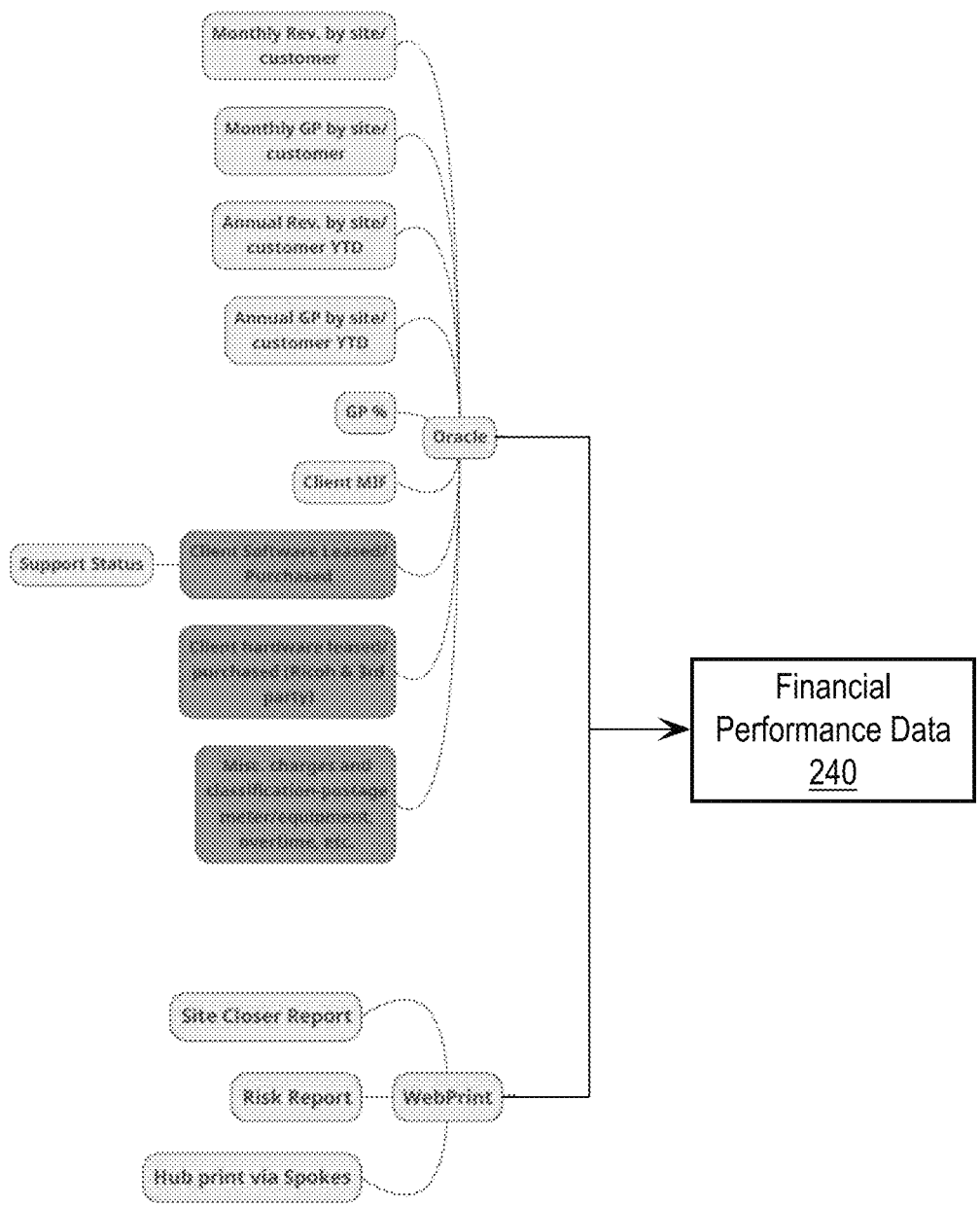
FIG. 2F is a block diagram that depicts example types of financial performance data 240.

FIG. 2F is a block diagram that depicts example types of the financial performance data 240. In this example, the first level of the financial performance data 240 includes Oracle and Webprint data for purposes of explanation, but embodiments are applicable to data from any type of software case management tool. Also, embodiments are applicable to any type of leased or purchased hardware, software or services.

Figure 2G:
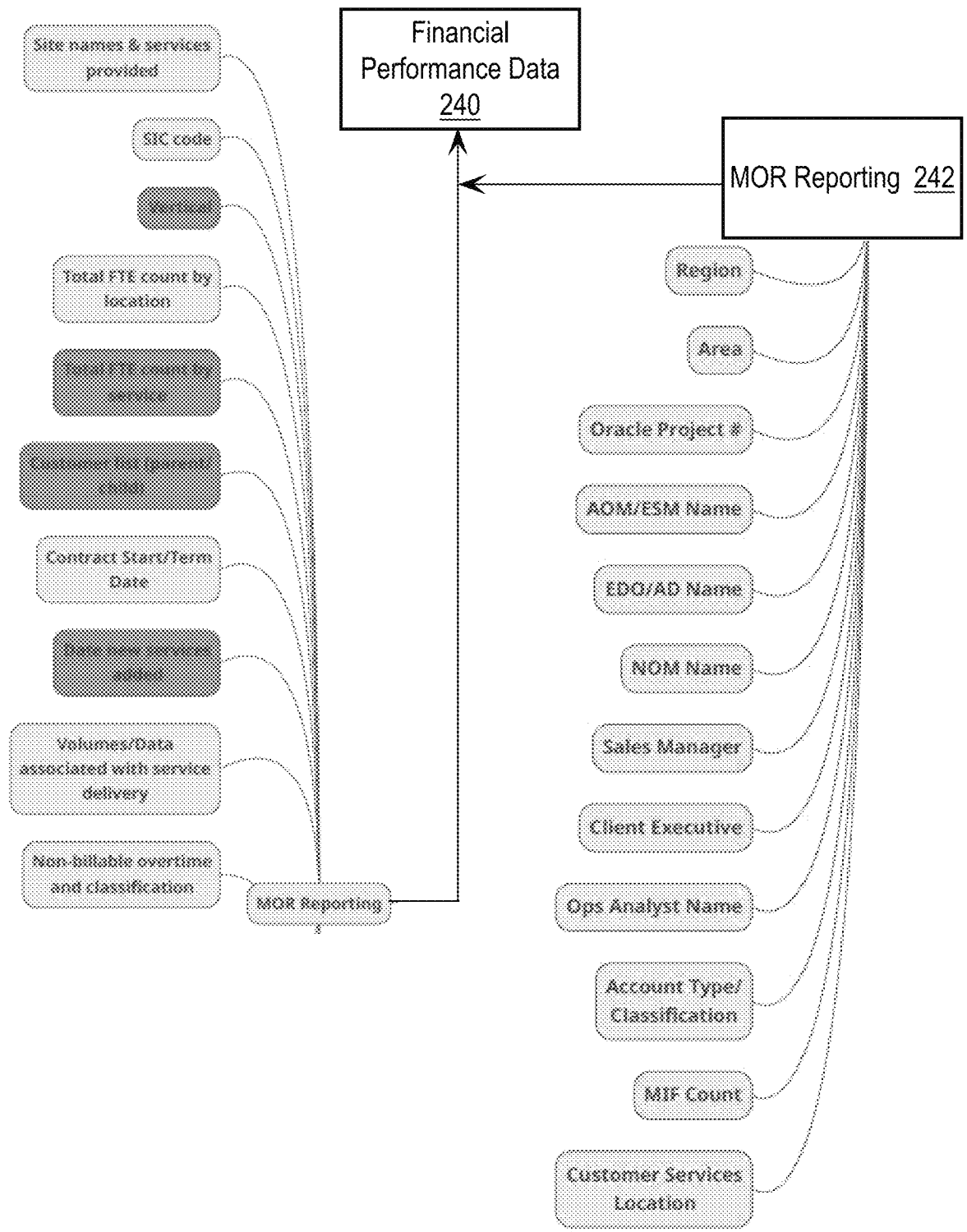
FIG. 2G is a block diagram that depicts other example types of financial performance data.

FIG. 2G is a block diagram that depicts other example types of the financial performance data 240. In this example, the first level of the financial performance data 240 includes various types of Monthly Operational Reporting data.

Figure 2H:
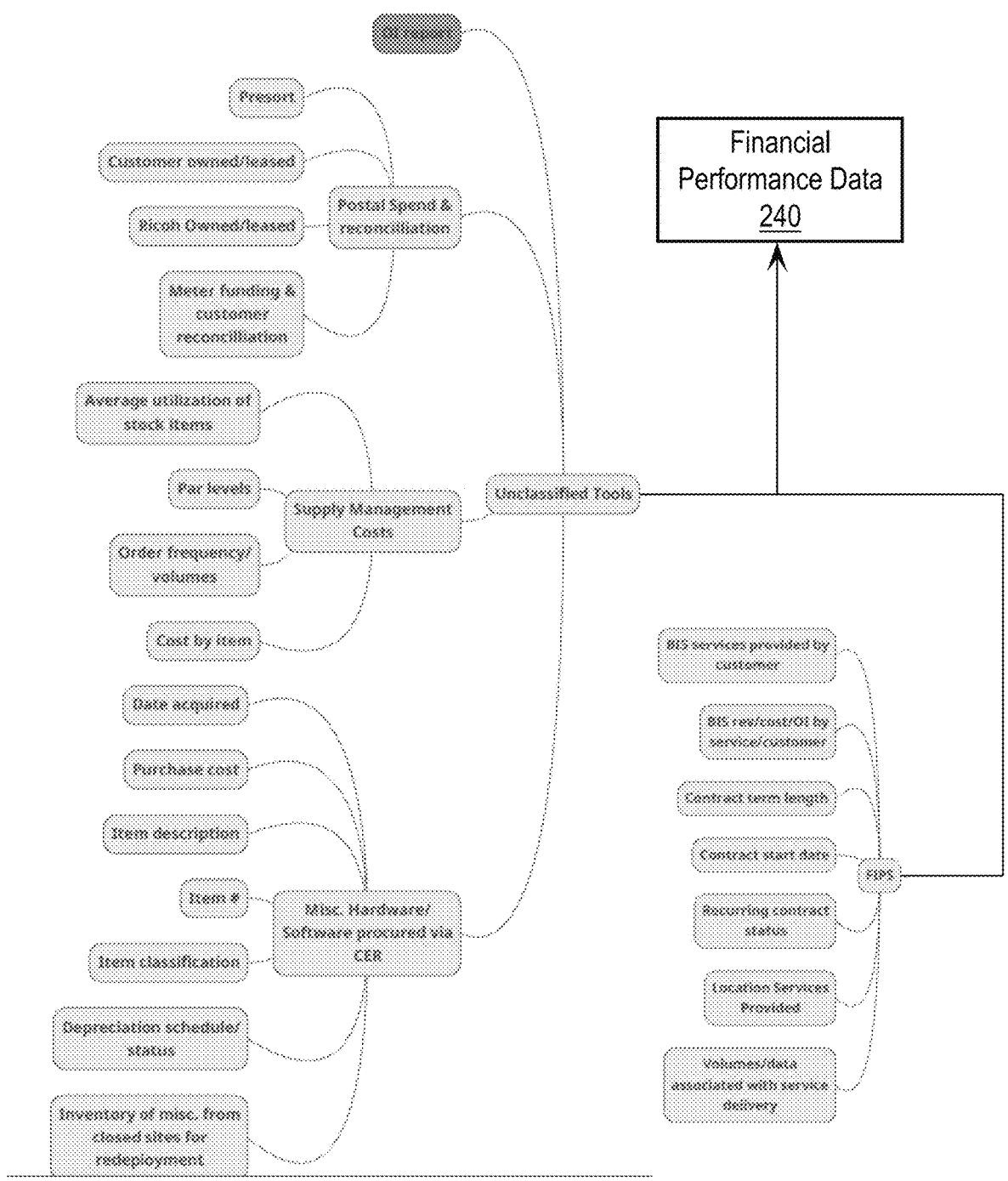
FIG. 2H is a block diagram that depicts further example types of financial performance data.
Figure 21:
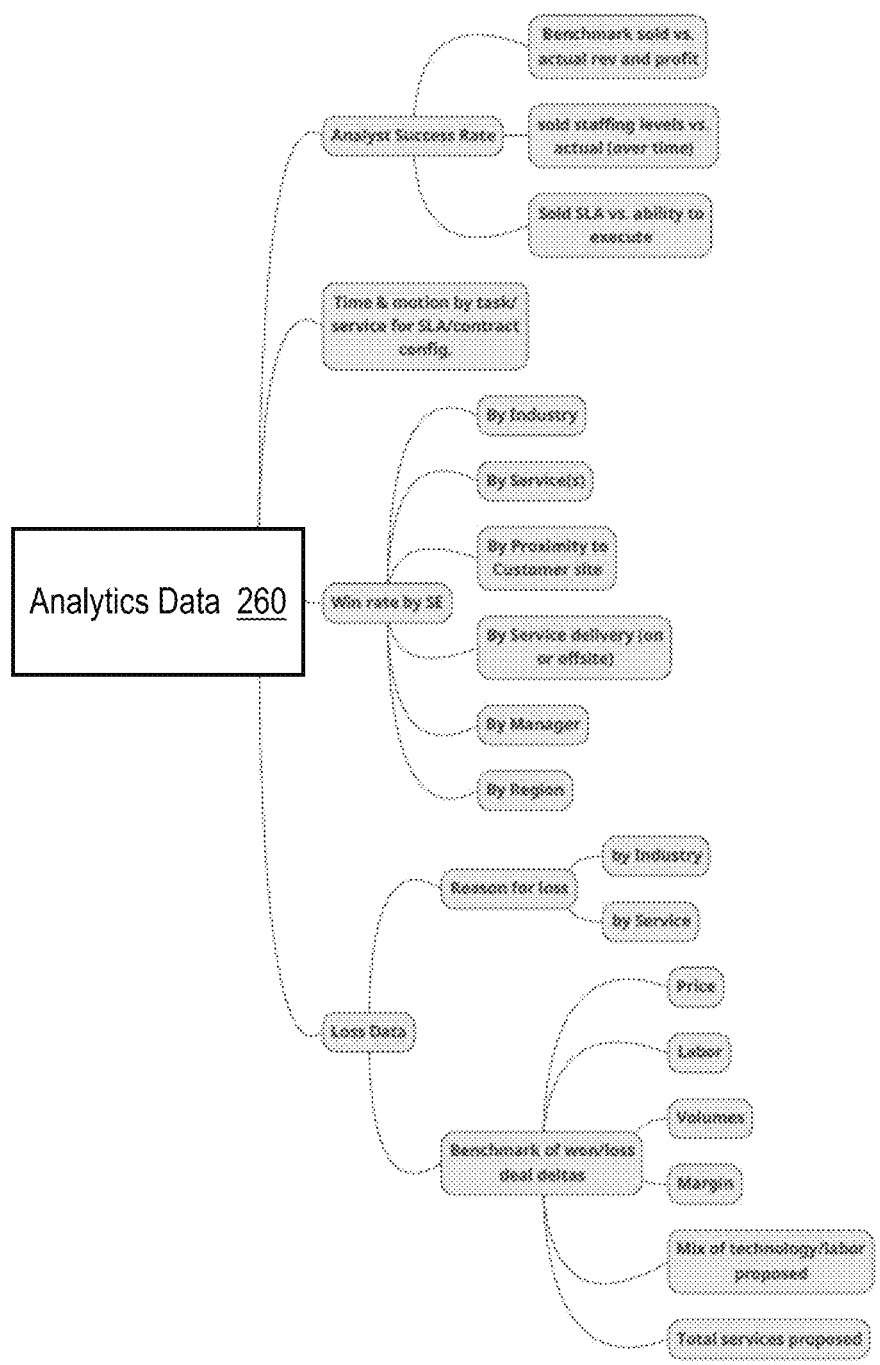

FIG. 2H is a block diagram that depicts further example types of the financial performance data 240. In this example, the first level of the financial performance data 240 includes unclassified tools data and billing systems data.

FIG. 2I is a block diagram that depicts example types of the analytics data 260. In this example, the first level of the analytics data 260 includes analyst success rate, time and motion by task/service for SLA/contract configuration, win rate by sales, and loss data.

Figure 2J:
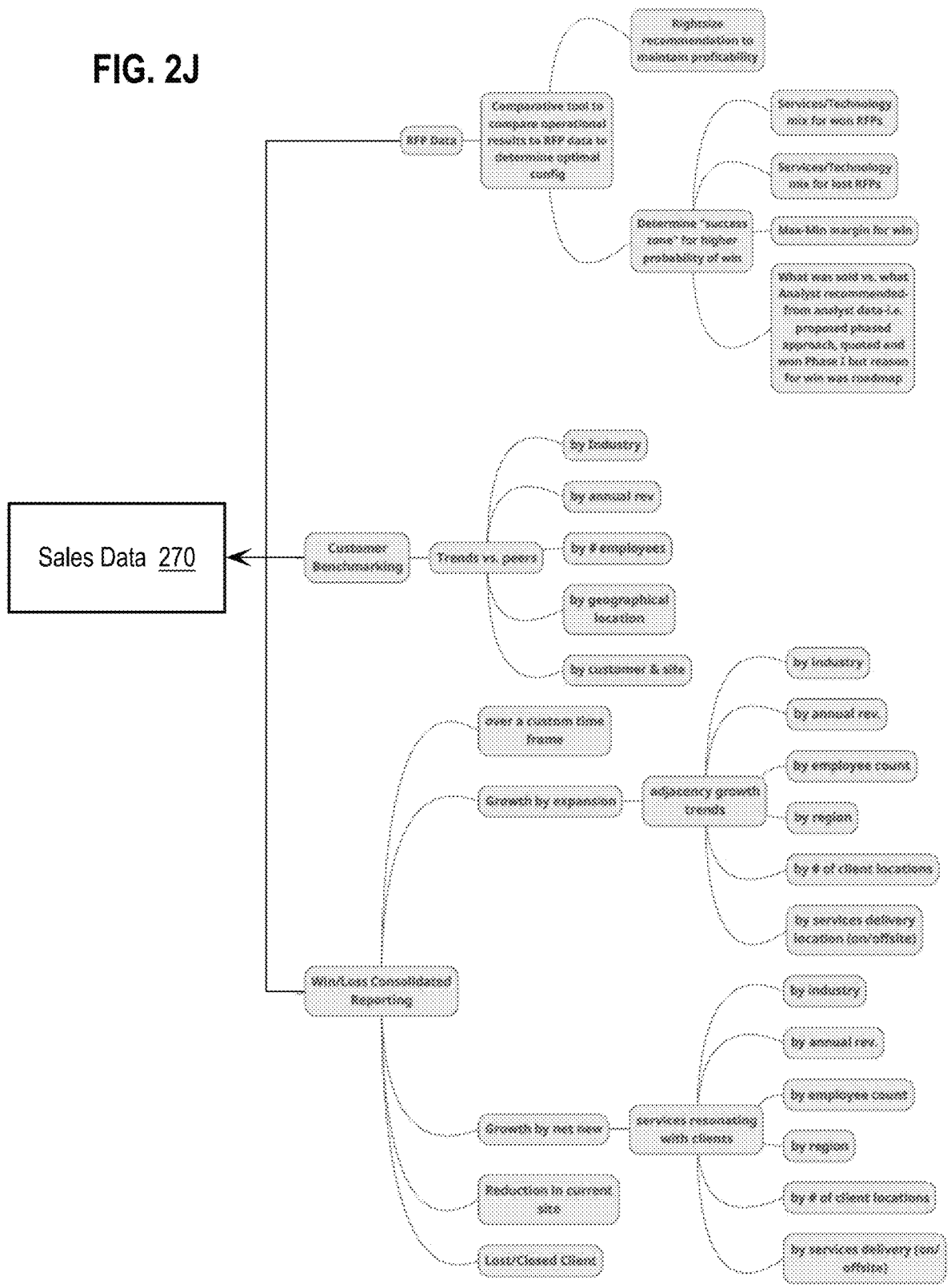
FIG. 2J is a block diagram that depicts example types of sales data.

FIG. 2J is a block diagram that depicts example types of the sales data 270. In this example, the first level of the sales data 270 includes Request For Proposal (RFP) data, customer benchmarking, and win/loss consolidated reporting. According to an embodiment, the analytic reporting data 250 may be supplemented with data from third-party data sources. One example in the context of the sales data 270 of FIG. 2J is supplementing the customer benchmarking data with customer data from third-party data sources. For example, the customer benchmarking data may be supplemented with information from U.S. government sites pertaining to revenue or other data related to a particular industry, retrieved via Standard Industry Classification (SIC) codes. The customer benchmarking data may also be supplemented with company-specific information including, for example, financial information (revenue, market segments, etc.), geographic locations, number of employees, etc. The data may be retrieved using APIs provided by the third-party data sources, or RPA, as previously described herein.

Figure 2K:
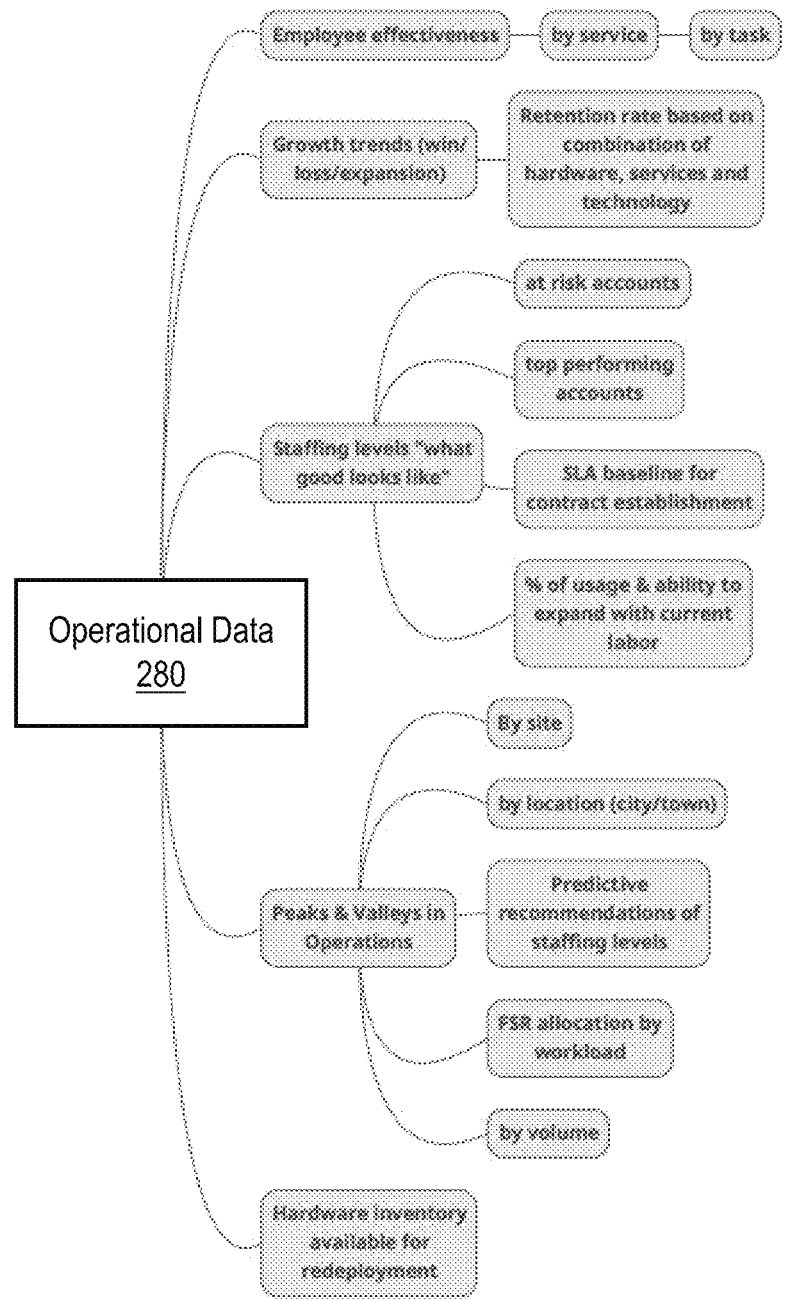
FIG. 2K is a block diagram that depicts example types of operational data.

FIG. 2K is a block diagram that depicts example types of the operational data 280. In this example, the first level of the operational data 280 includes employee effectiveness, growth trends (win/loss expansion), staffing levels, peaks and valleys operations, and hardware inventory available for redeployment.

Figure 2L:
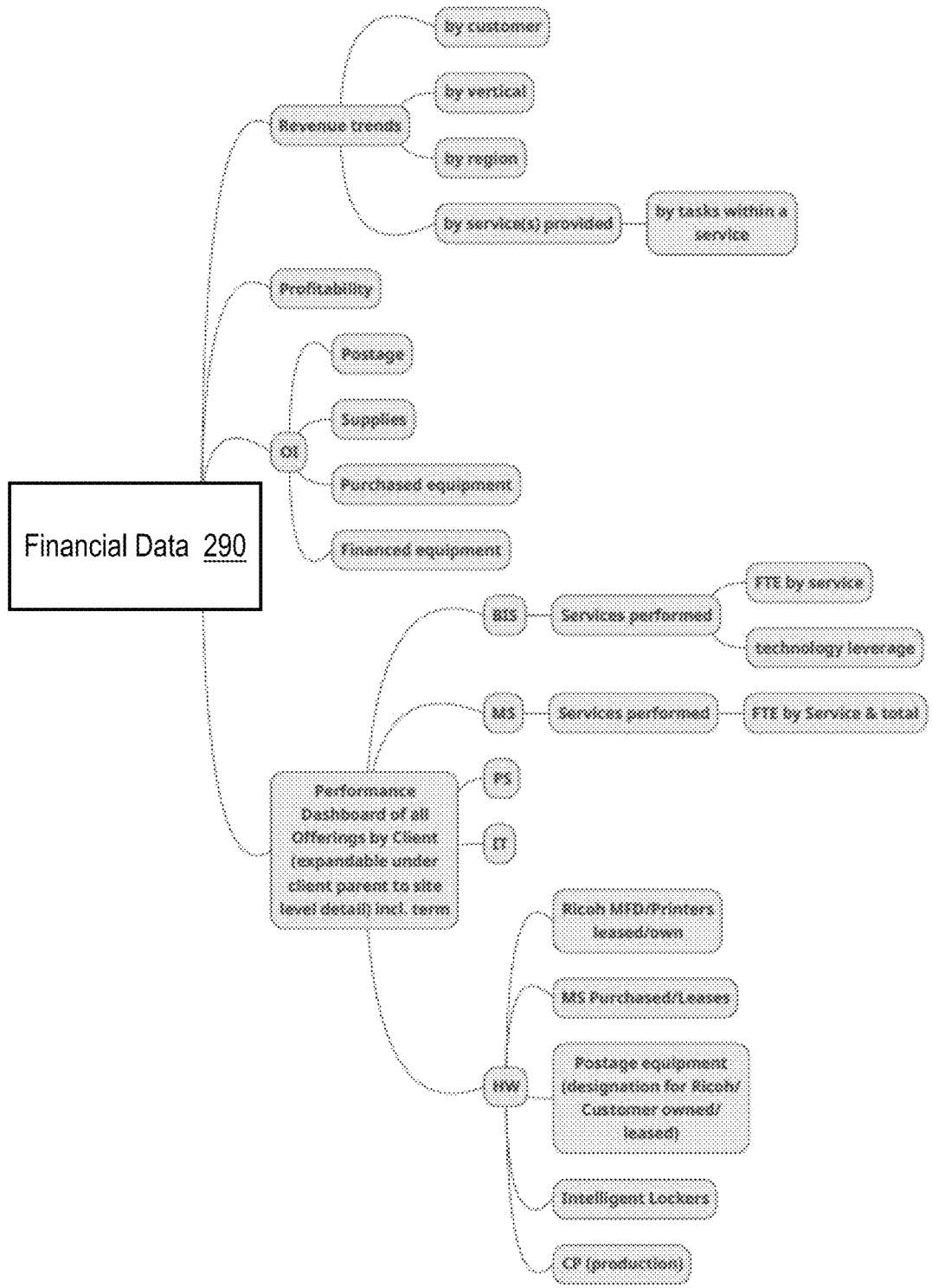
FIG. 2L is a block diagram that depicts example types of financial data.

FIG. 2L is a block diagram that depicts example types of the financial reporting data 290. In this example, the first level of the financial reporting data 290 includes revenue trends, profitability, Operating Income, and performance dashboard information including Business Information Services (BIS), Managed Services (MS), Professional Services (PS), Consulting Services, Information Technology (IT), and Hardware (HW).

III. Intelligent Data Analytics

FIG. 3 is a flow diagram 300 that depicts an approach for generating intelligent data analytics from a plurality of heterogeneous data sources according to an embodiment. In step 302, data is retrieved from a plurality of heterogeneous sources. For example, the intelligent data manager 140 retrieves data from the data sources 180, 196, 198. The intelligent data manager 140 may retrieve the data automatically on a periodic basis or at specific times, in response to a user logging into the intelligent data manager 140, in response to a user requesting that the data be retrieved from the data sources 180, 196, 198, etc. The intelligent data manager 140 may retrieve data from the data sources 180, 196, 198 via one or more commands that conform to an API of each of the data sources 180, 196, 198. Alternatively, the data may be retrieved from the data sources 180, 196, 198 by the intelligent data manager 140 invoking the RPA process 148.

The data retrieved from the data sources 180, 196, 198 may be in a common data format or in different formats, depending upon a particular implementation. According to an embodiment, the intelligent data manager 140 stores the data retrieved from the data sources 180, 196, 198 as source data 160 in the storage 158. The data may be stored separately in the source data 160 or aggregated, depending upon a particular implementation. The source data 160 may be stored according to specified data types and data conversions and/or transformations may be performed to convert the source data 160 to the specified data types.

The intelligent data management application 146 may use the conversion/transformation data 162 to convert and or transform the data retrieved from the data sources 180, 196, 198 to the specified data types. For example, the conversion/transformation data 162 may include mappings from data types and/or formats of each of the data sources 180, 196, 198 to the specified data types and/or formats of the source data 160 and the intelligent data management application 146 uses the mappings to convert and or transform the data retrieved from the data sources 180, 196, 198 to the specified data types.

In step 304, the retrieved source data 160 is processed to generate processing results 164 that are stored in the storage 158. Processing the source data 160 may include aggregating or otherwise combining different data items of the source data 160 from the data sources 180, 196, 198. For example, the different types of the source data 200 depicted in FIG. 2A, including the sales activity data 210, the analyst activity data 220, the operational performance data 230, and the financial performance data 240 may be processed to generate the analytic reporting data 250, including the analytics data 260, the sales data 270, the operational data 280, and the financial reporting data 290. According to an embodiment, the analytic reporting data 250 includes or is based upon data from two or more of the data sources 180, 196, 198.

In step 306, the processing results 164 are accessed. For example, the intelligent data manager 140 may provide a Web-based user interface to allow the client devices 110, 130 to access the processing results 164. The Web-based user interface may comprise a plurality of Web pages that the intelligent data manager 140 provides to the client devices 110, 130. This allows users to access the analytic reporting data 250, including the analytics data 260, the sales data 270, the operational data 280, and the financial reporting data 290, without the client devices 110, 130 having to support the APIs of the data sources 180, 196, 198. The processing results 164 accessed by the user of the client devices 110, 130 may be stored in storage 124 as the local processing results 126. This allows the user of the client device 110 to work offline, i.e., without a connection to the intelligent data manager 140. An application executing on the client devices 110, 130 may also access the processing results 164 via the API 150.

According to an embodiment, access to the processing results 164 is provided via views and different views may provide access to each type of the analytic reporting data 250. For example, a first set of views provides access to the analytics data 260, a second set of views provides access to the sales data 270, a third set of views provides access to the operational data 280 and a fourth set of views provides access to the financial reporting data 290. As used herein, the term "view" refers to a subset of the processing results 164 that the intelligent data management application 146 presents to a user.

In the context of sales and operations, example views include, without limitation, buying trends and market opportunity, SLA benchmarking and optimized head count and skill sets, predictive labor models, and harnessing data from past performance to improve forecast accuracy and close rates. For example, a view allows a user to identify whether an existing SLA overestimated or underestimated the type and amount of labor required to provide the contracted service. The SLA may underestimate the number of personnel needed to provide the contracted service or was missing a specific type of labor that was required to provide the contracted service. As another example, a view allows a user to identify a more optimal use of personnel by rebalancing personnel to different projects based upon the needs of each project throughout the workday. The use of views in this manner allows users to design future SLAs that better meet the needs of the client, by completely fulfilling the contracted service, while optimizing the financial return of the service provider.

Using views in this manner provides numerous benefits. In the context of sales, views provide customer benchmarking and industry trends as a sales tool, show field effectiveness and forecasting, price points in wins/losses to predict success and early indicators of commoditization of a service and/or product. For example, views can allow a user to identify market segments where the results have been poor because the services offered do not comply with a regulatory requirement. This allows the vendor to identify changes that need to be made to the offered services to comply with the regulatory requirement or to refocus sales efforts to other industry segments that do not have the regulatory requirement.

In the context of operations, views help to optimize production based upon data-driven predictive analytics by proactively identifying accounts at risk by performance and identifying optimization opportunities for Full-Time Employee (FTE) headcount and assignment. Also, in the context of operations, views provide visualization of operations performance metrics versus standards, which provides insight to identify SLA commitments that hold and/or improve margin and time spent on tasks and/or service level reporting versus total FTE count.

In the context of design, views show design effectiveness (proposed design versus operational performance), strengthen study findings through pooled trends in industry versus isolation, and identify formulas for customer purchase decisions to inform recommendations.

In the context of management (leadership and strategy), views create smarter customer journey paths, identify growing and/or declining markets, OI and margin trends, shows audience segmentation and targeting to improve success and customer retention, creates more influential and compelling case studies, and provides a roadmap for portfolio enhancement and the "next big thing."

Although embodiments are depicted in the figures and described herein in the context of data at a particular point in time, embodiments are not limited to these examples and are applicable to time-based views. Time-based views provide access to the processing results 164 over time and show changes in the processing results 164 over time. This may be beneficial in a variety of contexts. For example, in the sales context, time-based views may show RFP data, customer benchmarking results, and win/loss consolidated reporting results over time. This allows sales representatives to view the evolution of customers over time, identify trends, and improve the effectiveness of future RFPs.

According to an embodiment, users are granted access to particular views based upon their user credentials. A mapping between user credentials and views may be stored in the user data 166. For example, a sales representative may be granted access to one or more sales data views for the sales data 270. In this example, the sales data views allow the sales representative to see benchmarking data for their own customers and customers of other sales representatives. This may include viewing current services of the sales representative's customers and current services of other sales representatives' customers to identify services that the sales representative might want to offer their customers. For example, suppose that a particular customer of the sales representative currently has services A and B. Suppose further that another sales representative has a customer that has a similar business profile to the particular customer of the sales representative and currently has services A, B, C, and D. The views allow the sales representative to quickly and easily see that services C and D are good candidate services to be offered to the particular customer. An operations manager is given access to operations views that display data pertaining to operations. General managers are given access to all available views.

Figure 4:
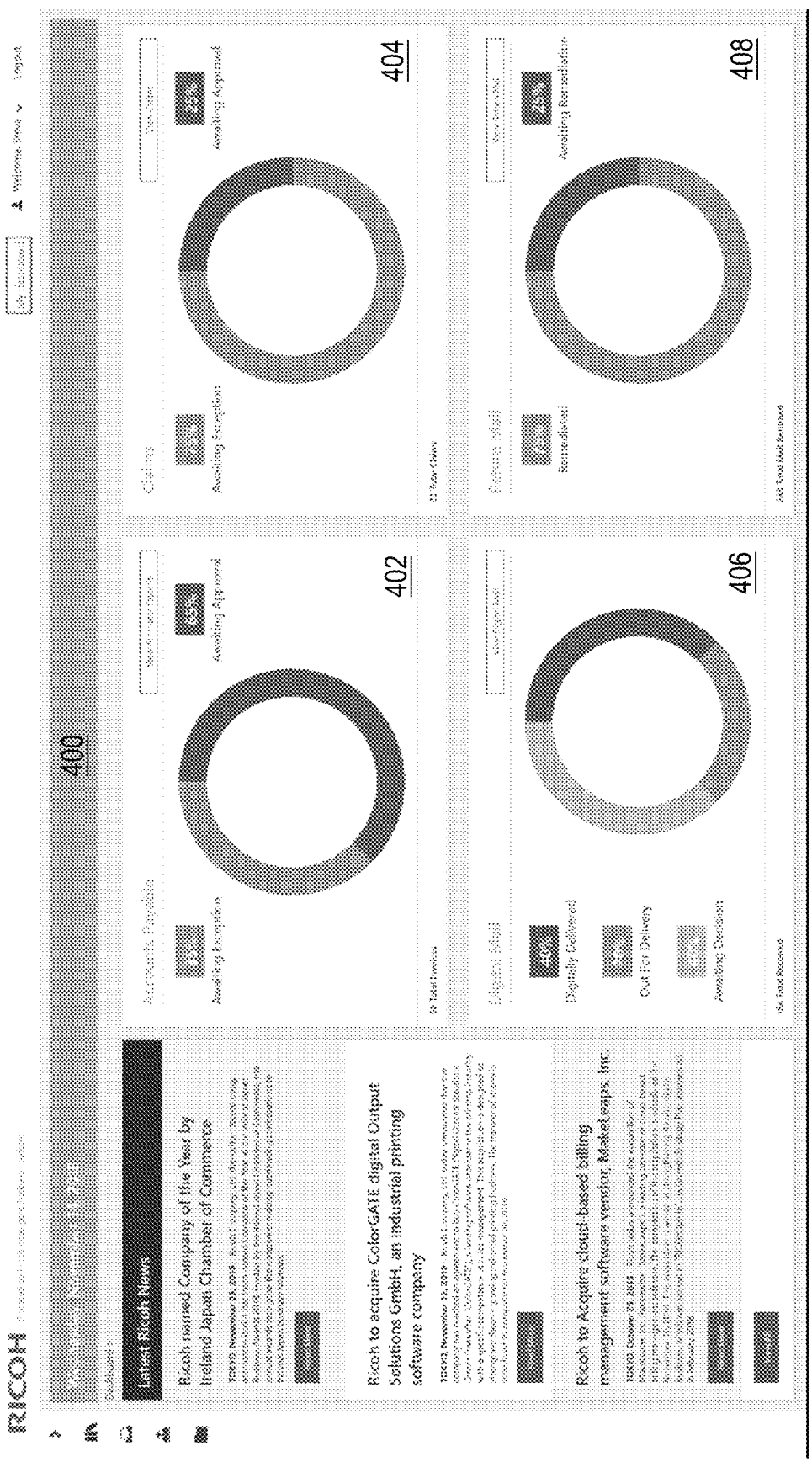
FIG. 4 depicts an example view customized for a particular user.

FIG. 4 depicts an example view 400 customized for a particular user. In this example the view 400 is in the form of a dashboard that provides a news feed on the left, and four data areas that include an accounts payable data area 402, a claims area 404, a digital mail area 406, and a return mail area 408. The accounts payable area 402 displays invoice statistics including a percentage of invoices that are awaiting approval and a percentage of invoices that are awaiting exception. The claims area 404 displays claims statistics including a percentage of claims that are awaiting approval and a percentage of claims that are awaiting exception. The digital mail area 408 displays digital mail statistics including a percentage of digital mail that have been digitally delivered, a percentage of digital mail that are out for delivery, and a percentage of digital mail that are awaiting a decision. The return mail area 408 displays return mail statistics including a percentage of return mail that are awaiting remediation and a percentage of return mail that have been remediated.

V. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
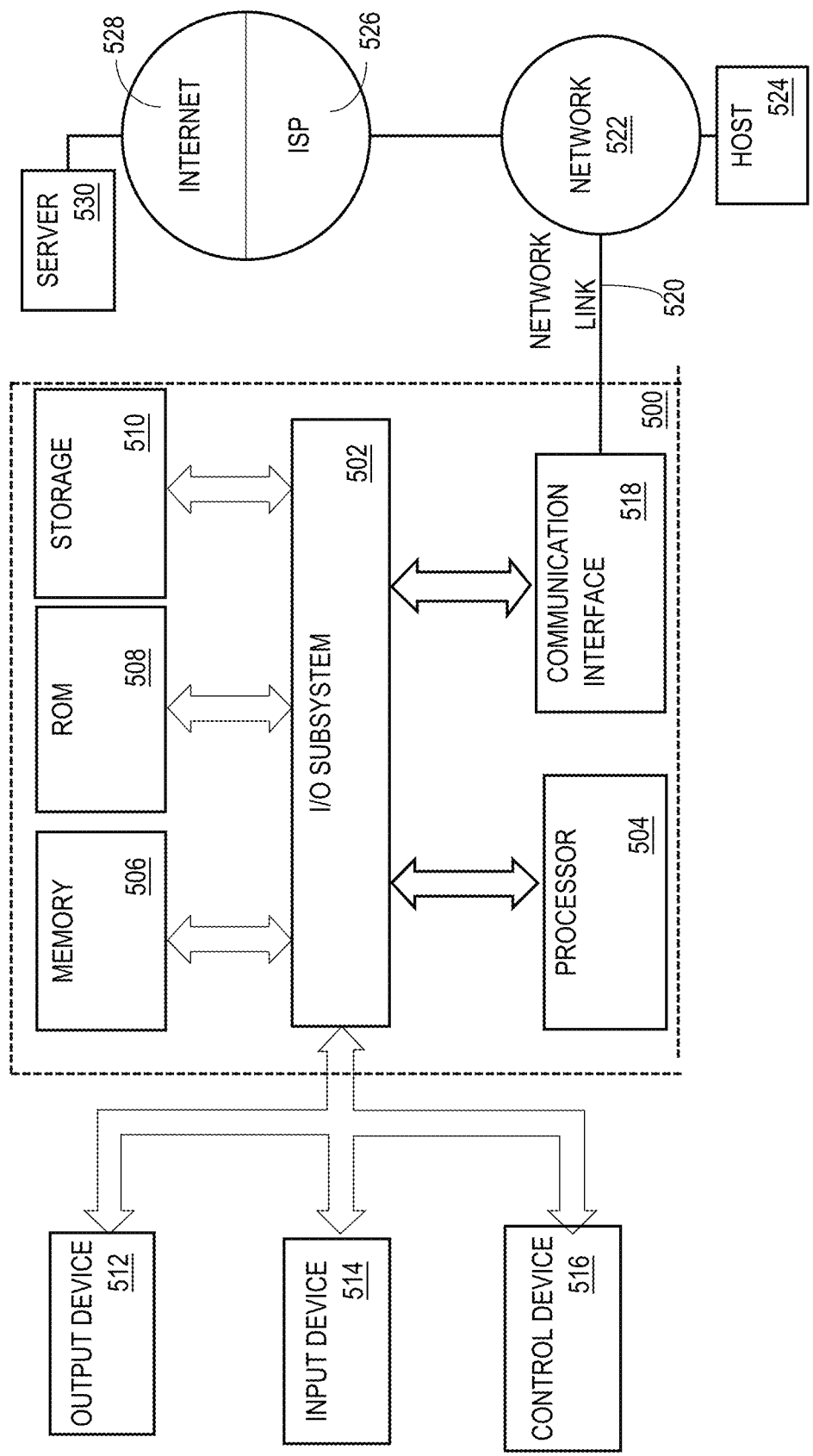
FIG. 5 is a block diagram that depicts an example computer system upon which embodiments may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The invention claimed is:

1. A computing device comprising:
one or more processors;
one or more memories; and
an intelligent data management application executing on the computing device and being configured to:
retrieve source data from a plurality of heterogeneous data sources via one or more computer networks, wherein each heterogeneous data source, from the plurality of heterogeneous data sources, supports a different Application Program Interface (API), wherein the retrieving of the source data from the plurality of heterogenous data sources includes generating and transmitting, to each heterogeneous data source, from the plurality of heterogenous data sources, one or more commands that conform to the API of the heterogenous data source,
process the source data from the plurality of heterogeneous data sources to generate processing results, and
provide at least a subset of the processing results to a client device via one or more computer networks.

2. The computing device as recited in claim 1, wherein: retrieving the source data from the plurality of heterogenous data sources is performed using Robotic Performance Automation (RPA) by invoking an RPA process that generates an action list of user input via the user interface of the computing device and then executes the action list.

3. The computing device as recited in claim 1, wherein the intelligent data management application is further configured to use conversion/transformation data to convert the source data from the plurality of heterogeneous data sources into one or more specified data types.

4. The computing device as recited in claim 1, wherein:
the source data from the plurality of heterogeneous data sources includes sales activity data, analyst activity data, operational performance data, and financial performance data, and
the processing results comprise analytic reporting data that includes analytics data, sales data, operational data, and financial data.

5. The computing device as recited in claim 1, wherein the intelligent data management application is further configured:
receive, from a first user of a client device, a request to access the processing results,
determine, based upon user credentials of the first user, one or more views of the processing results that the user is authorized to access, wherein a view of the processing results comprises a subset of the processing results,
causing the one or more views of the processing results that the user is authorized to access to be presented to the first user via a user interface of the client device.

6. The computing device as recited in claim 5, wherein the one or more views of the processing results comprise changes in processing results over time.

7. The computing device as recited in claim 5, wherein the one or more views of the processing results comprise benchmarking results for a Service Level Agreement (SLA).

8. One or more non-transitory computer-readable media storing instructions which, when processed by one or more processors, cause:
an intelligent data management application executing on a computing device to:
retrieve source data from a plurality of heterogeneous data sources via one or more computer networks, wherein each heterogeneous data source, from the plurality of heterogeneous data sources, supports a different Application Program Interface (API), wherein the retrieving of the source data from the plurality of heterogenous data sources includes generating and transmitting, to each heterogeneous data source, from the plurality of heterogenous data sources, one or more commands that conform to the API of the heterogenous data source,
process the source data from the plurality of heterogeneous data sources to generate processing results, and
provide at least a subset of the processing results to a client device via one or more computer networks.

9. The one or more non-transitory computer-readable media as recited in claim 8, wherein:
retrieving the source data from the plurality of heterogenous data sources is performed using Robotic Performance Automation (RPA) by invoking an RPA process that generates an action list of user input via the user interface of the computing device and then executes the action list.

10. The one or more non-transitory computer-readable media as recited in claim 8, wherein processing of the instructions further causes the intelligent data management application to use conversion/transformation data to convert the source data from the plurality of heterogeneous data sources into one or more specified data types.

11. The one or more non-transitory computer-readable media as recited in claim 8, wherein:
the source data from the plurality of heterogeneous data sources includes sales activity data, analyst activity data, operational performance data, and financial performance data, and
the processing results comprise analytic reporting data that includes analytics data, sales data, operational data, and financial data.

12. The one or more non-transitory computer-readable media as recited in claim 8, wherein processing of the instructions further causes the intelligent data management application to:
receive, from a first user of a client device, a request to access the processing results,
determine, based upon user credentials of the first user, one or more views of the processing results that the user is authorized to access, wherein a view of the processing results comprises a subset of the processing results,
causing the one or more views of the processing results that the user is authorized to access to be presented to the first user via a user interface of the client device.

13. The one or more non-transitory computer-readable media as recited in claim 12, wherein the one or more views of the processing results comprise changes in processing results over time.

14. The one or more non-transitory computer-readable media as recited in claim 12, wherein the one or more views of the processing results comprise benchmarking results for a Service Level Agreement (SLA).

15. A computer-implemented method comprising:
an intelligent data management application executing on
   a computing device:
      retrieving source data from a plurality of heterogeneous data sources via one or more computer networks, wherein each heterogeneous data source, from the plurality of heterogeneous data sources, supports a different Application Program Interface (API), wherein the retrieving of the source data from the plurality of heterogenous data sources includes generating and transmitting, to each heterogeneous data source, from the plurality of heterogenous data sources, one or more commands that conform to the API of the heterogenous data source,
      processing the source data from the plurality of heterogeneous data sources to generate processing results, and
      providing at least a subset of the processing results to a client device via one or more computer networks.

16. The computer-implemented method as recited in claim 15, wherein:
retrieving the source data from the plurality of heterogenous data sources is performed using Robotic Performance Automation (RPA) by invoking an RPA process that generates an action list of user input via the user interface of the computing device and then executes the action list.

17. The computer-implemented method as recited in claim 15, further comprising the intelligent data management application using conversion/transformation data to convert the source data from the plurality of heterogeneous data sources into one or more specified data types.

* * * * *